United States Patent [19]

Flores

[11] 4,223,865
[45] Sep. 23, 1980

[54] MOLDING ASSEMBLY FOR FORMING WINDING ARBORS

[76] Inventor: Salomon S. Flores, 2046 N. Kedvale, Chicago, Ill. 60639

[21] Appl. No.: 934,869

[22] Filed: Aug. 18, 1978

Related U.S. Application Data

[60] Division of Ser. No. 779,309, Mar. 21, 1977, Pat. No. 4,131,242, which is a continuation-in-part of Ser. No. 719,404, Sep. 1, 1976, abandoned.

[51] Int. Cl.$^3$ ............................................. B29C 1/14
[52] U.S. Cl. ................................. 249/144; 249/142; 249/157
[58] Field of Search ............... 249/53 R, 63, 142, 155, 249/157, 158, 177, 144; 425/171, 172

[56] References Cited

U.S. PATENT DOCUMENTS

| | | | |
|---|---|---|---|
| 840,006 | 1/1907 | Miller et al. | 249/63 |
| 849,392 | 4/1907 | Herring | 249/155 |
| 975,481 | 11/1910 | Tidnam | 249/142 |
| 2,416,559 | 2/1947 | Wilson | 249/155 |
| 2,635,320 | 4/1953 | Ornitz | 249/155 |
| 3,002,250 | 10/1961 | Huet | 249/155 |

*Primary Examiner*—James B. Lowe
*Attorney, Agent, or Firm*—Leo J. Aubel; Gerald T. Shekleton

[57] ABSTRACT

A method and apparatus for a universal winding arbor including an arbor core adapted for use with a plurality of differently sized arbor blocks in winding transformers of different sizes. Each differently sized arbor block may be formed in a unique mold which includes a vertically adjustable side and horizontally adjustable side to vary the thickness and width respectively. The arbor core is centered within the mold and a liquid resin is allowed to cure in the mold to form the winding arbor.

1 Claim, 4 Drawing Figures

MOLDING ASSEMBLY FOR FORMING WINDING ARBORS

This is a Div. of Ser. No. 779,309, filed Mar. 21, 1977, now U.S. Pat. No. 4,131,242, which is a C-I-P of application Ser. No. 719,404, filed Sept. 1, 1976, now abandoned.

BACKGROUND OF THE INVENTION

This invention relates to electrical transformers and, more particularly, to a universal winding arbor.

In the placement of windings about cores for the manufacture of a transformer, the many different manufacturers and models of transformers require different size core diameters about which the wire is wound. Heretofor when manufacturing a transformer for a given application, different size winding cores were thus made necessary by such different sizes of transformers on the market. Thus, individual shops found that when winding transformers from a variety of sources it must stock a large plurality of differently sized winding arbors to have the capability of servicing the many different lines of transformers. Not only does this requirement necessitate an extraordinary amount of storage area for the individual shop but the wear and tear on each individual arbor is enhanced by the increased amount of handling which it undergoes during the necessary changeovers from one size to another. In addition, as most shops found it too burdensome to carry all possible sizes of winding arbors, when a transformer had to be wound which required a size core not available, it was necessary to grind a larger steel rod down to the appropriate size, a costly and time-consuming operation.

It is therefore a principal object of the subject invention to provide a universal winding arbor adapted to be used with a plurality of specifically sized winding cores.

Another object of the subject invention is a universal winding arbor which is easily adaptable for use with the various sizes of manufacturer's winding cores.

SUMMARY OF THE INVENTION

The method and apparatus for a universal winding arbor of the subject invention comprises a method whereby a winding block is formed to a desired size, having a removable arbor core centered in the block throughout its length. The arbor core is a generally rectangular rod though spherical at its longitudinal extremities, preferably of steel or iron and of generally straight dimensions. A peg extends transversely of the rod at one extremity, and the end opposite this peg is threaded to accept a nut.

The arbor block is formed to have an interior opening extending the length of the block. This opening is precisely centered and is formed to admit the winding arbor in a close fitting relationship. The insertion of the winding arbor into the block is made with the threaded end first, the peg end of the arbor retaining the arbor block at the desired location on the arbor core, aided by the nut which is tightened onto the threaded portion of the arbor core. A plate extends upwardly from one end of the center rectangular portion of the arbor block to serve as a stop for the paper tube on which the wire is to be wound in the wire winding process. The arbor core is inserted into the interior of the arbor block and fastened with a nut for positioning on a wire landing apparatus to wind the wire about the wire block.

The method of producing the various size arbor blocks of the apparatus of the subject invention is accomplished through a molding process which accurately positions the arbor core in a precise central location within the mold cavity which is adjusted to the dimension of the arbor block desired. A plastic resin is poured into the mold and cured through any appropriate means such as heat to give an arbor block of the desired dimensions with a precisely centered arbor core.

Further objects of the invention, together with additional features contributing thereto and advantages accruing therefrom will be apparent from the following description of one embodiment of the invention when read in conjunction with the accompanying drawings wherein:

DESCRIPTION OF A PREFERRED EMBODIMENT

Figure 1:
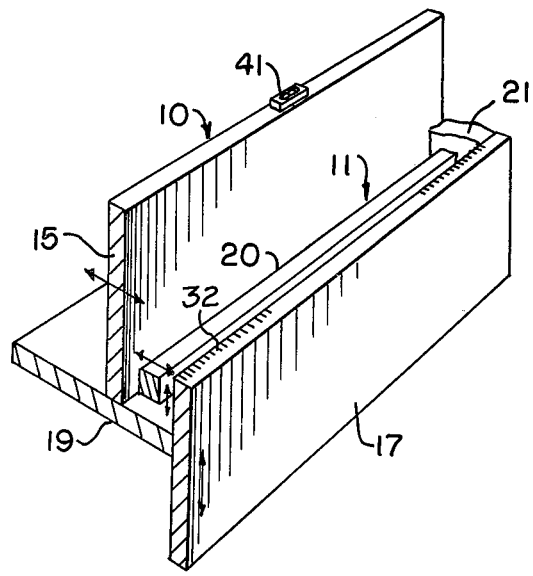
FIG. 1 is a partial perspective view of the arbor mold for use in the method of the subject invention, with one end not shown to better depict the position of the arbor core.
Figure 3:
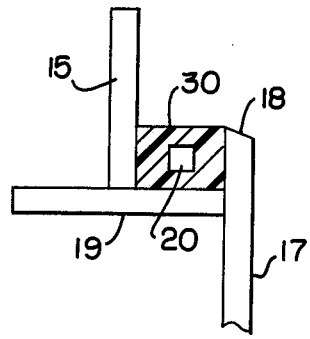
FIG. 3 is a cross section of the mold for use in the method of the subject invention showing an arbor block and core; and, FIG. 4 shows the arbor block and core of the subject invention.

Referring now to FIG. 1 in one embodiment of the subject invention there is shown an adjustable mold 10 having two vertical plates, upper plate 15 and lower plate 17, movably spaced from one another and fluid tightly connected through horizontal plate 19. The vertical plates 15 and 17 are adjustable in a horizontal direction to allow the size of the mold cavity 11 to change for forming the arbor block of a desired dimension. In this manner both the width and thickness of an arbor block may be varied as desired.

Levels 41 and 42 (FIG. 2) serve as an indication that the entire molding apparatus is precisely horizontal, so that the arbor block will be formed with substantially parallel sides. Of cource, the supports of the block mold are individually adjustable vertically (not shown) to achieve the horizontal position through the use of the levels 40 and 41.

Figure 4:
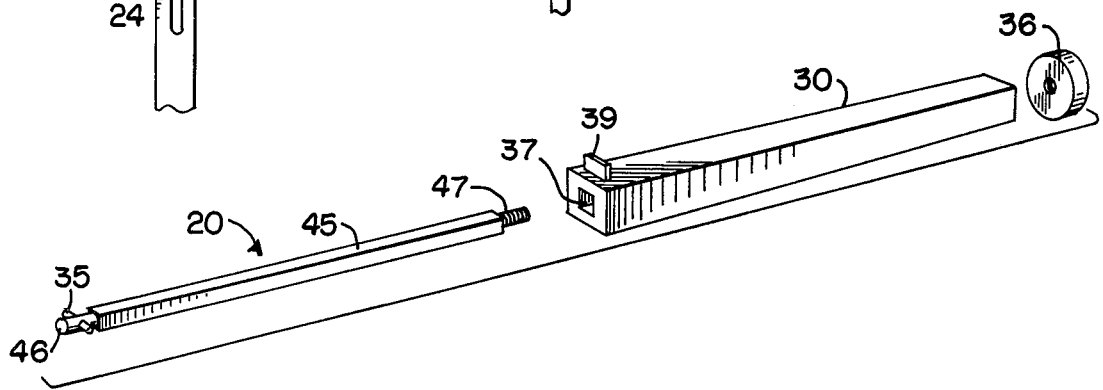

The arbor core 20 is positioned within the mold cavity 11 in a manner to be explained so as to be centered within the mold cavity. Clay or other resilient sealing material 21 is placed at each end of the mold cavity about the arbor core 20 to form a seal at each end. A mold release agent may be wiped or burnished into the mold cavity 11. Liquid plastic resin, preferably thermosetting, is poured into the mold cavity 11 about the arbor core 20 to completely fill the mold cavity 11. The resin is then cured through the utilization of heat or any other appropriate means. after which the plates 17 and 19 are moved outwardly and away from one another so that the arbor block and core may be easily removed, due to the previous placement of the mold release agent in the mold cavity. This method yields the universal winding arbor 30, shown in FIG. 4.

The arbor core 20 is preferably steel or titanium and may be used with any size arbor block. The core 20 itself comprises a center polygonal, and, in the preferred embodiment, rectangular portion 45 and spherical end portions 46 and 47. A pin 35 is inserted transversely into end portion 46 and the opposite end portion 47 is threaded. The arbor core 20 is inserted into the opening 37 of the block 30 and fixedly held by the transverse pin 35 which is biased against the arbor block by a nut 36 screwed onto the threaded portion 47 of the core 20.

In the method of forming the arbor block 30, the mold cavity 11 is first formed to the dimensions desired. This is accomplished by adjustment of upper plate 15 horizontally to achieve the width of the desired block and then adjusting lower plate 17 vertically for the thickness of the desired block. Graduations 25 and 27 are provided on plates 17 and 19 to allow an accurate positioning of plates 15 and 17 for the dimensions of the block.

Figure 2:
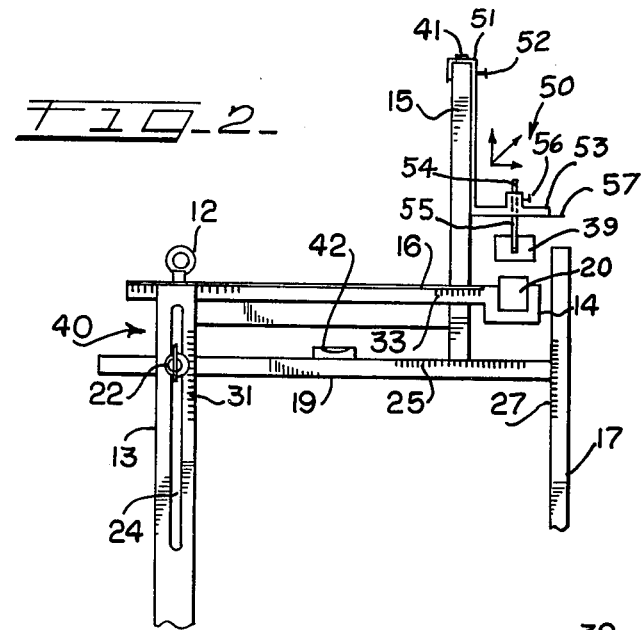
FIG. 2 is a side view of the mold of FIG. 1 showing the arbor core positioning apparatus.

The positioning of the arbor core 20 is accomplished in a similar manner through the use of positioning devices or mounting units at opposite ends of the adjustable mold 10. As both arbor cores mounting units are identical, only one needs to be described. Arbor core 20 shown in FIG. 2, is mounted within the mold cavity at each side through arbor core mount 40, comprising a vertically upstanding support 13 and a horizontal arm 16. A substantially U-shaped holder of a size which conforms to the dimensions of the arbor core is fixed onto the end of the horizontal support 16. The conformance of the holder portion 14 to the arbor core insures that the arbor core can be positioned substantially in the center of the molded arbor block. The horizontal arm is slideably mounted on the vertical support 13 and the vertical support 13 is slideably mounted on the horizontal plate 19. A threaded shaft (not shown) extends from the side of the horizontal plate 19. Vertical support 13 has a slot 24 in its midsection which is inserted over the threaded shaft so that the vertical support 13 may be moved vertically to a desired height and retained there through a tightening of the wing nut 22 on the threaded shaft. The horizontal arm 16 is mounted on the vertical support 13 in a similar manner so that the arm 16 may be extended to a desired length and retained at that length by tightening wing nut 22 on the shaft. Graduations 31 and 33 are placed on horizontal arm 16 and vertical support 13 for ease in positioning the arbor core 20 at the desired midpoint of the mold cavity 11.

Once the arbor core is so positioned in the manner described above, clay 21 is placed at each end of the mold cavity to seal each end as shown in FIG. 1 and described previously. A suitable mold release agent is brushed or burnished into the mold about the arbor core 20 and the clay 21. A plastic and preferably thermosetting resin is then poured into the mold cavity 11, care being taken to fill the mold to the top of the lower plate 17. The top portion 18 of the lower plate 17 may be angled downwardly away from the mold cavity 11 so that any excess spilling over from the mold cavity upon the inadvertent overfilling of the mold cavity 11, will drain away from the cavity edges and not cause flashing at the corners of the arbor block upon the curing of the resin.

A rectangular plate 39 is inserted into the uncured resin at one end of the mold cavity to extend upward from the resin surface a short distance equal to approximately one-fourth to one-third the thickness of the mold.

The plate 39 is held and positioned at the desired location with clamp assembly 50, which is slideably attached to upper plate 15 through U-clamp 51 and tightened when in the desired location by set screw 52. One end of the U-clamp 51 is elongated, having an arm 53 transversely attached at the end opposite the U-clamp 51. A pointer 57 is provided at the free end of the arm 53 to sighting onto the indicia 32 on the lower plate to allow amore precise positioning of the clamp assembly 50. On the mid-portion of the arm 53 is a vertical opening through which shaft 54 may slideably fit. A set screw 56 may be used to retain the shaft at a desired height. A longitudinal slot on the arm 53 (not shown) allows the positioning of the stop plate 39 to allow for different widths of arbor blocks. At the lower end of shaft 54 is a clamp 55 for holding the plate 39. By adjusting the positions of both the U-clamp 51 and and the shaft 54 the plate 39 may be located where desired along the length of the arbor block and to any desired depth.

The plate 39 is held in place until the resin cures about it. Curing of the resin may be accomplished through any appropriate means such as through the application of heat or light. At the end of the curing cycle, the clay 21 may be removed, the plates 15 and 17 moved outwardly and the arbor block 30 thereby formed may be easily removed from the mold with the aid of the mold release agent previously applied and may be used immediately in the winding of wire for transformers.

With this method for the forming of differently sized arbor blocks adapted to be used with the selected arbor core, it can be seen that a large stock of winding arbors is no longer necessary for the production of transformers; since through the use of the method and apparatus of the subject invention, a selected core may be used with a plurality of differently sized arbor blocks to give a capacity never before possible, except at great expense. Thus, a winding arbor may be made easily adaptable to any size transformer, all at a low cost while still retaining the necessary dimensional accuracy. Further, the arbor winding block of the subject invention is lighweight, being considerably lighter than those of the prior art without loss in strength. The difference in weight, of course, is due to the use of plastic in the arbor blocks as a substitute for the steel of prior art arbors.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

I claim:

1. A molding assembly for forming winding arbors of varying sizes comprising a cavity with adjustable dimensions, said cavity including first and second substantially vertical plates, and a substantially horizontal plate, said first vertical plate being sealingly mounted to said horizontal plate for lateral movement relative to said horizontal plate for adjusting the width of said arbor, said second vertical plate being sealingly mounted on an end of said horizontal plate for vertical movement relative to said horizontal plate for adjusting the thickness of said arbor, said second vertical plate being equal or lower in height than the first vertical plate and having an upper surface angled downwardly away from said first vertical plate for the prevention of the formation of flashing on said winding arbor, arbor core positioning means at opposite ends of said cavity for positioning said arbor core in the center of said cavity and sealing means at opposite ends of said cavity for defining the length of said cavity.

* * * * *